United States Patent
Newton et al.

[11] Patent Number: 6,026,850
[45] Date of Patent: *Feb. 22, 2000

[54] PRESSURE REGULATING VALVE

[75] Inventors: John R. Newton, Jupiter, Fla.; Mark A. Lacko, Garrison; John R. Lavereck, Beacon, both of N.Y.; Edward A. Gilcrest, Jr., Southbury, Conn.

[73] Assignee: Global Agricultural Technology and Engineering, LLC, Deerfield Beach, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/607,850

[22] Filed: Feb. 27, 1996

[51] Int. Cl.$^7$ .................................................. G05D 16/08
[52] U.S. Cl. ................ 137/505.41; 137/505; 137/505.13
[58] Field of Search ................................ 137/505, 505.13, 137/505.18, 505.41

[56] References Cited

U.S. PATENT DOCUMENTS

| | | |
|---|---|---|
| 2,174,515 | 10/1939 | Hughes ........................ 137/505.41 X |
| 2,639,194 | 5/1953 | Wahlinr ................................ 137/510 |
| 3,424,196 | 1/1969 | Donner . |
| 3,643,685 | 2/1972 | Hays . |
| 3,872,884 | 3/1975 | Busdiecker et al. . |
| 3,943,969 | 3/1976 | Rubin et al. . |
| 4,080,993 | 3/1978 | Lind, Jr. . |
| 4,197,995 | 4/1980 | Campbell et al. . |
| 4,250,915 | 2/1981 | Rikuta . |
| 4,416,301 | 11/1983 | Brumm . |
| 4,437,493 | 3/1984 | Okuda et al. . |
| 4,508,140 | 4/1985 | Harrison . |
| 4,516,600 | 5/1985 | Sturman et al. ............... 137/505.18 X |
| 4,621,658 | 11/1986 | Buezis et al. . |
| 4,630,642 | 12/1986 | Detweiler ................................ 137/510 |
| 4,657,224 | 4/1987 | Lattuada . |
| 4,697,613 | 10/1987 | Wienck . |
| 4,838,305 | 6/1989 | Reinartz et al. ................... 137/505.13 |
| 4,852,606 | 8/1989 | Heneker .................................. 137/510 |
| 4,867,198 | 9/1989 | Faust . |
| 5,234,025 | 8/1993 | Skoglund et al. . |
| 5,241,986 | 9/1993 | Yie . |
| 5,255,711 | 10/1993 | Reeds . |
| 5,303,734 | 4/1994 | Eidsmore .......................... 137/505.43 |
| 5,341,968 | 8/1994 | Vandoninck . |
| 5,383,489 | 1/1995 | Golestan et al. . |
| 5,524,670 | 6/1996 | Castle . |
| 5,529,090 | 6/1996 | Golestan et al. . |
| 5,597,012 | 1/1997 | Moinard . |
| 5,642,752 | 7/1997 | Yokota et al. . |
| 5,727,529 | 3/1998 | Tuckey . |

FOREIGN PATENT DOCUMENTS

| | | |
|---|---|---|
| 530611 | 9/1956 | Canada . |
| 2006930 | 5/1979 | United Kingdom . |

*Primary Examiner*—Stephen M. Hepperle
*Attorney, Agent, or Firm*—Samuels, Gauthier & Stevens

[57] ABSTRACT

A pressure regulating valve adapted to be interposed between a pressurized liquid supply whose pressure varies and a spray nozzle or other liquid applicator from which the liquid is discharged. The valve, actuated only when the pressure of the incoming liquid exceeds a predetermined minimum level, functions to maintain the flow of liquid fed to the applicator at a substantially constant pressure level regardless of variations in the pressure of the liquid supply, and to cut off flow automatically should the supply pressure fall below an acceptable level.

14 Claims, 1 Drawing Sheet

Source of Pressurized Liquid → 11

To Spray Nozzle ← 12

PRESSURE REGULATING VALVE

BACKGROUND OF INVENTION

1. Field of Invention

This invention relates generally to regulating valves to control fluid flow, and more particularly to a pressure regulating valve supplied with a pressurized liquid whose pressure varies, the valve yielding a liquid having a substantially constant pressure level.

2. Status of Prior Art

A regulating valve derives its power of operation from the fluid being controlled and functions to hold constant a fluid quantity, such as pressure or flow velocity. While the invention resides in a regulating valve yielding a fluid having a substantially constant pressure and a valve of this type has many practical applications, a valve in accordance with the invention will be described herein in connection with a backpack spraying equipment, for in this context the valve has particular value. It is to be understood, however, that the valve is by no means limited to this application.

Suppliers of agricultural chemicals, such as insecticides, herbicides and fungicides in liquid form, have developed specific guidelines for the safe and effective use of these chemicals in order to satisfy requirements mandated by law. Typically, users of backpack spraying equipment must adjust their system for different product uses. This is done by installing a nozzle, a spray tip, or wand designed to afford the desired spray coverage. These nozzles or wands have different orifice sizes which when fed liquids at a certain pressure will then allow a calculable flow rate.

Backpack spray systems in current use are capable of producing liquid pressures for use up to 70 PSI. A hand-operated pump mechanism coupled to a small pressure chamber inside the backpack reservoir is used by the operator to maintain a satisfactory working pressure during applications of the liquid. Though this arrangement allows a user to quickly reach an acceptable working pressure and to begin spraying, it demands frequent pumping, and this gives rise to varying pressures.

Since flow rate is a function of both liquid pressure and the size of the orifice through which the liquid is discharged, backpack spray systems currently in use inherently produce varying flow rates. As a consequence, the user of the system has little control over the delivery of the chemicals being sprayed, and an excessive or an inadequate application of the chemicals is then difficult to avoid.

Many backpack spraying systems in current use are provided with a wand having a shut off valve, the wand being coupled to the liquid chemical reservoir in the backpack which includes a hand-operated pump mechanism. Should the operator open the spray wand valve before the system has been pumped to a satisfactory working pressure, the liquid will not then be sprayed out of the wand, but will instead drip, dribble or leak out of the wand and be deposited anywhere but on its intended target. The reason for this leakage is that when liquid is fed to a spray nozzle, it will only atomize and emerge as a spray when the pressure of the liquid is at a relatively high level. Should the pressure fall below this level, it will simply leak out of the nozzle.

This leakage of chemicals is not only wasteful, but it may also be hazardous if the leaked liquids make contact with the operator's skin or clothing. Such leakage can also occur if during a spraying operation the liquid pressure drops below a level at which the liquid atomizes.

SUMMARY OF INVENTION

In view of the foregoing, the main object of the invention is to provide a pressure regulating valve adapted to be interposed between a pressurized liquid supply whose pressure is unregulated and therefore varies, and a spray nozzle or other liquid applicator from which the liquid is discharged, the valve functioning to maintain at a substantially constant level the pressure of liquid fed to the applicator regardless of variations in the supply liquid pressure.

A significant feature of a regulating valve in accordance with the invention is that it acts automatically to cut off flow when the level of pressure of the liquid supplied thereto falls below an acceptable minimum value. Thus when the valve is interposed in a backpack spraying system and the liquid pressure of the liquid in the backpack reservoir falls below a level sufficient to effect spraying, the flow of liquid is interrupted until such time as the liquid pressure rises above the minimum level.

Briefly stated, these objects are accomplished by a pressure regulating valve adapted to be interposed between a pressurized liquid supply whose pressure varies and a spray nozzle or other liquid applicator from which the liquid is discharged, the valve functioning to maintain the flow of liquid fed to the applicator at a substantially constant pressure level regardless of variations in the pressure of the liquid and to cut off flow automatically should this pressure fall below an acceptable level.

The regulating valve includes an input section whose inlet is coupled to the supply of pressurized liquid, the input section having a barrier wall at its end provided with a central port. And included is an output section having an outlet coupled to the applicator. Interposed between the input and output sections is a diaphragm chamber which regulates liquid flow between the sections. This chamber includes a spring-biased piston that normally urges a diaphragm against the outer surface of the barrier wall.

Anchored on the piston is a stem that projects through the port into the input section and is coaxial therewith to define a flow passage. The stem terminates in an inverted conical throttle head which defines an orifice whose size depends on the distance between the inner surface of the head and the inner surface of the barrier wall, the orifice passing liquid into the port flow passage.

When liquid pressure in the input section is sufficient to actuate the valve by overcoming the spring pressure urging the diaphragm against the outer surface of the barrier wall, the diaphragm is then displaced from the wall to permit liquid to flow from the orifice through the flow passage into the diaphragm chamber and from there into the output section to be discharged therefrom. The displacement of the diaphragm is a function of the liquid pressure in the input section and results in a corresponding displacement of the throttle head, thereby reducing the size of the orifice to lower the pressure of the liquid in the diaphragm chamber.

As a consequence, when the valve is actuated and the pressure of liquid supplied to the input section varies, the size of the orifice feeding this liquid into the flow passage leading into the diaphragm chamber is modulated to maintain the liquid in the chamber at a substantially constant pressure level.

BRIEF DESCRIPTION OF DRAWINGS

For a better understanding of the invention, as well as other objects thereof, reference is made to the following detailed description to be read in conjunction with the accompanying drawings wherein.

Figure 1:
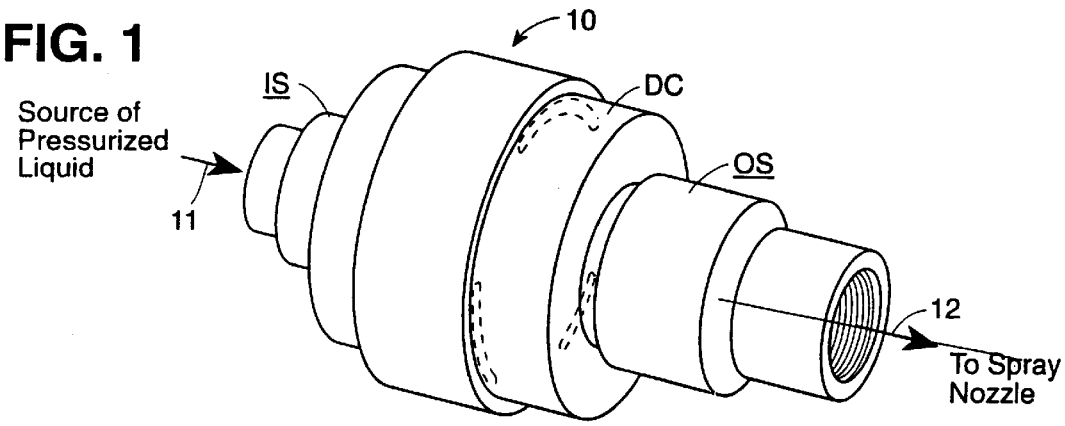
FIG. 1 is a perspective view of a pressure regulating valve in accordance with the invention.
Figure 2:
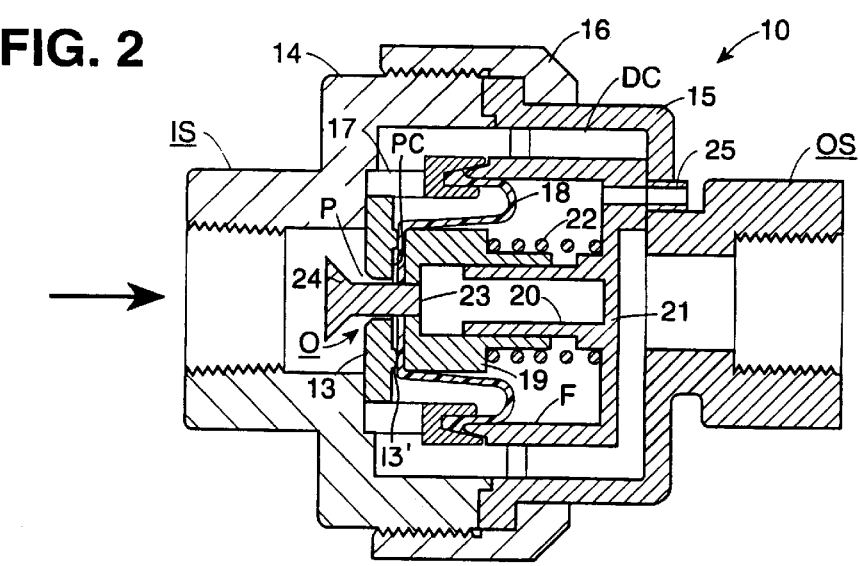
FIG. 2 is a longitudinal section taken through the valve which illustrates the internal structure of the valve and its operation when the pressurized liquid supplied thereto has a pressure insufficient to actuate the valve.
Figure 3:
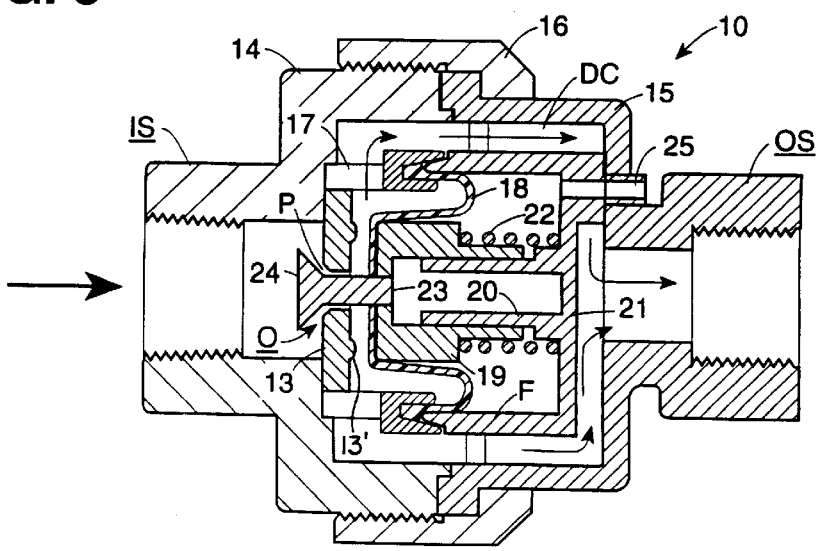
FIG. 3 is a section taken through the valve when the input liquid pressure is at a level sufficient to actuate the valve to cause liquid to be discharged from its outlet at a substantially constant pressure level.

DESCRIPTION OF THE INVENTION
The Regulating Valve Structure:

FIG. 1 illustrates a regulating valve in accordance with the invention, generally identified by reference numeral 10. Valve 10 is interposed between a source 11 of pressurized liquid whose pressure varies, and a spray nozzle 12 or other liquid applicator from which the liquid is discharged.

Valve 10, which is actuated only when the pressure of the incoming liquid exceeds a predetermined minimum level, function to maintain the flow of liquid fed to spray nozzle at a substantially constant pressure level regardless of variations in the pressure of liquid supplied to the valve and to cut off flow automatically should the supply pressure fall below an acceptable level.

In the case of backpack spraying equipment in which a chemical is sprayed on crops, a regulating valve 10 in accordance with the invention will automatically cut off liquid when the liquid pressure is insufficient to atomize the liquid to produce a spray; hence the valve will avoid leakage of the liquid from the valve. And when the pressure of the liquid is above the minimum level at which atomization takes place, valve 10 will then regulate the flow of liquid fed to the spray nozzle to maintain a substantially constant pressure despite variations in supply liquid pressure. Consequently the user of the valve-regulated system is able to apply a proper volume of the agricultural liquid chemical to the crops being sprayed and to avoid an excessive or an inadequate application of the liquid.

As shown in FIG. 2, regulating valve includes an input section IS whose tubular inlet is coupled to a backpack or other liquid supply whose pressure varies. The input section is provided at its end and with a barrier wall 13 having a central port P therein. The valve also includes an output section OS whose outlet is coupled to a spray nozzle or other liquid applicator.

Interposed between input section IS and output section OS is a diaphragm chamber DC which regulates the flow of liquid from the input to the output section. The valve is provided with a housing forme of cylindrical components 14 and 15 clamped together by an internally threaded collar 16.

Disposed within diaphragm chamber DC is a cylindrical shell 17 supported on barrier wall 13, the shell being concentric with port P. Mounted on shell 17 is a flexible diaphragm 18 having a flat face parallel to the outer surface of barrier wall 13. Engaging the flat surface of diaphragm 16 is the nose of a hollow piston 19 which is slidable on a post 20 anchored on the base 21 of a cylindrical frame F. Frame F is supported on shell 17 coaxially within the diaphragm chamber DC.

Interposed between a shoulder on piston 19 and base 21 is a compressible helical spring 22 that acts to urge the flat face of diaphragm 18 against a raised ring 13' which projects into the diaphragm chamber DC from the outer surface of barrier wall 13. Anchored on the nose of piston 19 and projecting through port P into input section IS is a stem 23. Stem 23 is coaxial with port P to define an annular flow passage connecting the input section to the diaphragm chamber DC. Stem 23 terminates in a throttle head 24 having an inverted conical form whose inner surface is spaced from the inner surface of barrier wall 13 to define an annular orifice O that leads into the flow passage. The size of orifice O depends on the distance between head 24 form and barrier wall 13. The diaphragm 18 and piston 19 thus comprise a diaphragm assembly connected to the throttle head 24 by stem 23 to thereby provide an adjustable modulating unit. When the modulating unit is biased by spring 22 into a closed position as shown in FIG. 2, the flat face of the diaphragm 18 is pressed against the raised ring 13' to thereby define a pressure chamber PC which is open to the input section 15 via the flow passage through the barrier wall 13, and closed to the diaphragm chamber DC.

Cylindrical frame F is joined to shell 17 to form an internal cavity which houses the spring-biased piston, the cavity being vented to the atmosphere through a vent hole 25.

As indicated by the arrows in FIG. 3, when the flat face of the diaphragm is displaced away from the raised ring 13' on the barrier wall 13, liquid then flows through openings in shell 17 into the annular space between frame F and the casing of the valve, and from there into the free space between base 21 of the frame and the entry to the outlet section OS, the liquid then passing through the outlet section from which it is discharged.

Operation:

FIG. 2 illustrates the state of valve 10 when the pressure of the incoming liquid from the supply is insufficient to actuate the valve. In that state, the flat face of diaphragm 18 is pressed by the spring biased piston 19 against the raised ring 131 on the outer surface of the barrier wall 13 to block the flow passage in port P. Hence when the pressure of the liquid from the source is at a predetermined minimum level below that necessary to overcome the force of the spring 22, flow to the spray nozzle is cut off.

When, however, the supply liquid pressure acting on the throttle head 24 in the input section and on the flat face of the diaphragm within the confines of the pressure chamber PC is at a level sufficient to overcome the spring force, then as shown in FIG. 3, the flat face of diaphragm 18 is displaced from the raised ring 13' projecting from the barrier wall so that now the liquid can flow from the input section IS through the flow passage in port P into diaphragm chamber DC.

The degree to which the piston engaging the flat face of the diaphragm is displaced away from the outer surface of barrier wall 13 depends on the pressure of liquid in input section IS. The higher the pressure, the greater the piston displacement and the greater the degree to which throttle head 24 is brought closer to the inner surface of barrier wall 13. The closer the head is to the barrier wall, the smaller is the size of orifice O which admits liquid into the port flow passage.

Hence the size of orifice O and the rate of liquid flow therethrough is modulated as an inverse function of the pressure of liquid in the input section, the higher the pressure, the smaller the orifice size. By so modulating the orifice size and liquid flow rate, for any given nozzle size the pressure of liquid fed into diaphragm chamber DC is maintained at a substantially constant pressure level regardless of the varying pressure of liquid in the input section IS, but only as long as this pressure is at a level sufficient to actuate the valve.

If, for example, an input section liquid pressure of 30 PSI is sufficient to actuate the valve, as this pressure then varies from 30 to 70 PSI, the pressure in the diaphragm chamber will be maintained at about 32 PSI so that the pressure of liquid discharged from the output section and fed to an applicator will be maintained at a substantially constant pressure level. But should the pressure of liquid fed into the valve fall below an acceptable level, the valve will automatically cut off and remain in this state until the pressure of liquid supplied thereto exceeds a predetermined minimal level.

While there has been shown a preferred embodiment of a pressure regulating valve in accordance with the invention, it will be appreciated that many changes may be made therein without departing from the spirit of the invention.

I claim:

1. A regulating valve adapted to be interposed between a pressurized fluid supply whose pressure varies and a fluid applicator from which the fluid is discharged, the valve when actuated functioning to maintain the pressure of fluid fed to the applicator at a substantially constant level regardless of variations in the pressure of said fluid supply, said valve comprising:
   A. an input section having an inlet coupled to said supply, and having at its end a barrier wall provided with a central port, and an output section having an outlet coupled to said applicator;
   B. a diaphragm chamber interposed between said input section and said output section; and
   C. modulating means including a diaphragm in said diaphragm chamber for modulating the size of said port as an inverse function of the varying pressure of the fluid in said input section whereby the pressure of the fluid in the diaphragm chamber is maintained at a substantially constant level, said valve being automatically actuated when the varying pressure of fluid in said input section exceeds a predetermined minimum level, and being automatically closed when said varying pressure is insufficient to achieve valve actuation.

2. A valve as set forth in claim 1, in which said diaphragm is normally urged against an outer surface of the barrier wall by a spring-biased piston.

3. A valve as set forth in claim 2, in which said diaphragm is mounted on a shell support on said barrier wall.

4. A valve as set forth in claim 3, in which a stem is anchored on the piston and projects through said port into the input chamber, the stem being coaxial with the port to define a flow passage between the input section and the diaphragm.

5. A valve as set forth in claim 4, in which the stem terminates in a throttle head that defines with an inner surface of the barrier wall an orifice leading into said flow passage.

6. A valve as set forth in claim 5, in which the head has an inverted conical form whose inner surface is spaced from the inner surface of the barrier wall.

7. A valve as set forth in claim 6, in which the pressure applied to said piston by said spring is such that when the pressure of the fluid in the input section overcomes the spring pressure to displace the diaphragm, the size of the orifice is then modulated as a function of the fluid pressure.

8. A valve as set forth in claim 7, in which said piston is slidable on a post anchored on the base of a frame supported on said shell.

9. A valve as set forth in claim 8, in which said spring is interposed between a shoulder on said piston and the base of the frame.

10. A valve as set forth in claim 9, provided with a cylindrical casing concentric with said frame.

11. A regulating valve adapted to be interposed between a pressurized fluid supply whose pressure varies and a fluid applicator from which the fluid is discharged, the valve when actuated functioning to maintain the pressure of fluid fed to the applicator at a substantially constant level, said valve comprising:
   A. a housing having an input section adapted to be connected to said pressurized fluid supply, an outlet section adapted to be connected to said applicator, and a diaphragm chamber interposed between said input and output sections, said diaphragm chamber being in communication with said output section and being separated from said input section by a barrier wall having a port extending therethrough; and
   B. a modulating unit including a diaphragm assembly in said diaphragm chamber connected to throttle head in said input section by a stem, said stem extending through and cooperating with said port to define a flow passage and said throttle head coacting in spaced relationship with said barrier wall to define an orifice leading to said flow passage, said modulating unit being movably responsive to variations in the pressure of the fluid being supplied to said input section to maintain the pressure of the fluid being delivered to said applicator via said flow passage, diaphragm chamber and output section at a substantially constant level by varying the size of said orifice as an inverse function of the fluid pressure in said input section, said valve being automatically opened when the varying pressure of the fluid being supplied to said input section exceeds a predetermined minimum level, and being automatically closed when said varying pressure is insufficient to achieve valve actuation.

12. The regulating valve as claim in claim 11 wherein said barrier wall has a ring surrounding said opening and protruding into said diaphragm chamber, and spring means for resiliently urging said modulating unit into a closed position at which said diaphragm assembly is pressed against said ring to cooperate therewith in defining a pressure chamber open to said input section via said flow passage and closed to said diaphragm chamber.

13. The regulating valve as claimed in claim 12 wherein said valve is opened by fluid pressure acting on said throttle head in said input section and on said diaphragm assembly within said pressure chamber.

14. A regulating valve adapted to be interposed between a pressurized fluid supply whose pressure varies and a fluid applicator from which the fluid is discharged, the valve when actuated functioning to maintain the pressure of fluid fed to the applicator at a substantially constant level, said valve comprising:
   A. a housing having an input section adapted to be connected to said pressurized fluid supply, an outlet section adapted to be connected to said applicator, and a diaphragm chamber interposed between said input and output sections, said diaphragm chamber being in communication with said output section and being separated from said input section by a barrier wall having a port extending therethrough, said barrier wall having a ring thereon surrounding said port and protruding from said barrier wall into said diaphragm chamber;
   B. a modulating unit including a diaphragm assembly in said diaphragm chamber connected to throttle head in said input section by a stem, said stem extending through and cooperating with said port to define a flow passage and said throttle head coacting in spaced relationship with said barrier wall to define an orifice leading to said flow passage; and
   C. spring means for resiliently urging said modulating unit into a closed position at which said diaphragm assembly is pressed against said ring to cooperate therewith in defining a pressure chamber open to said input section via said flow passage and closed to said diaphragm chamber, said modulating unit being shiftable from said closed position to an open position in response to fluid pressure above a predetermined level in said pressure chamber and being movable when in said open position in response to variations in the pressure of the fluid acting on said diaphragm assembly to vary the size of said orifice in a manner such as to maintain the pressure of the fluid being delivered to said applicator via said flow passage, diaphragm chamber and output section at a substantially constant level.

* * * * *